UNITED STATES PATENT OFFICE.

WILLIAM D. GRIMSHAW, OF ROCKY HILL, NEW JERSEY.

IMPROVEMENT IN WATER-PROOF COMPOUNDS.

Specification forming part of Letters Patent No. 160,898, dated March 16, 1875; application filed January 25, 1875.

CASE A.

*To all whom it may concern:*

Be it known that I, WILLIAM DEAKIN GRIMSHAW, of Rocky Hill, in the county of Somerset and State of New Jersey, have invented certain new and useful Improvements in Water and Acid Proofing Compounds for Textile Fabrics; and I do hereby declare that the following is a full, clear, and exact description thereof, which will enable others skilled in the art to which it pertains to make and use the same.

The invention herein consists of a compound for water and acid proofing textile fabrics for various uses, such as the production of bags for carrying and storing articles of any description, and for any covering or enveloping purposes.

This coating composition has lamp-black for one of its component parts, and which forms a very essential element, in combination with other articles and the proportions of the several parts, in producing a composition well adapted for waterproofing articles.

The proportions of the several parts herein declared have been determined in the light of experiment and in the use of the coating, and are therefore held an important matter in producing a suitable and durable coating.

Crude gum or rubber is thoroughly washed in pure water, in a machine adapted for the purpose, to cleanse its surface of all foreign matters. It is dried, and then reduced from its natural bulky, to a comparatively thin or sheet, condition, for the purpose of masticating it to accomplish two important results—viz., to bring it to a condition to be more readily dissolved, but more especially to open any cells which may be formed in the body of the material, and which are usually filled with foreign substances, such as sand, and which, without such mastication, would very materially render the gum unfit for covering purposes and retard its reduction to a liquid state, while at the same time the expulsion of this confined matter also carries away any vapors which may be contained in the cells, and which would otherwise interfere with the proper action of the reducing materials upon the gum. Of the gum thus prepared, to form a batch, say, of thirty pounds of the composition, I take six pounds and submerge it in two gallons of benzine or any suitable cutting-fluid, and let it remain about ten hours to reduce it to a plastic state. Then add fifteen pounds of whiting or chalk, five pounds of oxide of zinc, two pounds of asphaltum, seven ounces of pulverized suphur. To this I add two pounds of lamp-black. The mixture is then subjected to agitation in a closed vessel till thoroughly mixed and brought to the proper consistency to be spread upon the fabric. The object is to produce a water and acid proof composition that can be worked with the best results, and for this purpose the employment of lamp-black serves, especially in its combination with the oxide of zinc, to neutralize the action of acids in using the coated bags for carrying and storing fertilizers.

The composition thus prepared is spread upon the fabric in any suitable way, and the coated material is subjected to a steam heat in a closed chamber under a pressure of about thirty pounds to the inch for the period of two hours, to vulcanize or cure the article.

The lamp-black serves to increase the bulk of the compound and to render the coated fabric more soft and pliable, and, as it is a carbon, it is therefore one of the best proofs against the action of acids, and forms, with rubber, the chief element of the composition. Its affinity for the rubber is such that it readily harmonizes, so as to become a constituent of the gum by forming a mechanical combination therewith, and thereby more effectually prevent the eating and dissolving action of the acids, while maintaining a pliable condition of the coating, and give to it a fine spreading body.

Its employment greatly cheapens the composition. The lamp-black protects the other ingredients, which might be attacked by the acids in the compound. It is fine, light, and becomes thoroughly incorporated with the other materials, and, as no acids will dissolve it, no corrosion of the compound can take place. The lamp-black spreads a large surface. Two pounds will double the bulk of any other ingredient used in the compound.

I often use coarse material with large meshes, and it is necessary that the compound should be as cheap as possible, for as much of it fills and gives solidity to the meshes as is used in forming the surface-coating.

The acids referred to are such as are put in to form what are known as manipulated fertilizers, and the compound will resist such acids.

The proportion of gum stated herein is well suited to produce a very cheap compound, while also being very serviceable for the purpose; but it is obvious that the body of the compound may be made to give a more smooth surface by increasing the proportion of the gum.

I claim—

The composition herein described, in which lamp-black is combined with cleaned and masticated rubber, benzine, whiting or chalk, oxide of zinc, asphaltum, and sulphur, substantially in the proportions herein stated, for use in waterproofing fabrics, as described.

In testimony that I claim the foregoing I have affixed my signature in presence of two witnesses.

WILLIAM D. GRIMSHAW.

Witnesses:
A. E. H. JOHNSON,
J. W. HAMILTON JOHNSON.